United States Patent
Ko (10) Patent No.: US 12,512,518 B2
(45) Date of Patent: Dec. 30, 2025

(54) SYSTEM AND METHOD FOR PREDICTING VENT OCCURRENCE TIME OF BATTERY CELL

(71) Applicant: LG ENERGY SOLUTION, LTD., Seoul (KR)

(72) Inventor: Dong Wan Ko, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 529 days.

(21) Appl. No.: 18/018,756

(22) PCT Filed: Jun. 29, 2022

(86) PCT No.: PCT/KR2022/009293
§ 371 (c)(1),
(2) Date: Jan. 30, 2023

(87) PCT Pub. No.: WO2023/277561
PCT Pub. Date: Jan. 5, 2023

(65) Prior Publication Data
US 2023/0299366 A1   Sep. 21, 2023

(30) Foreign Application Priority Data

Jul. 1, 2021 (KR) .................. 10-2021-0086372

(51) Int. Cl.
*H01M 10/42*       (2006.01)
*G01B 11/02*       (2006.01)
(Continued)

(52) U.S. Cl.
CPC ....... *H01M 10/4228* (2013.01); *G01B 11/022* (2013.01); *G01R 31/367* (2019.01);
(Continued)

(58) Field of Classification Search
CPC .. H01M 10/4228; H01M 50/30; H01M 10/48; G01R 31/392; G01R 31/367; G01B 11/022
(Continued)

(56) References Cited

U.S. PATENT DOCUMENTS 9,470,602 B2   10/2016   Yasooka et al.
9,917,335 B2 *  3/2018   Jarvis ................ H01M 10/4257
(Continued)

FOREIGN PATENT DOCUMENTS

CN   109064701 A   12/2018
CN   108414943 B   12/2020
(Continued)

OTHER PUBLICATIONS

Notice of Allowance issued Feb. 13, 2024 for Japanese Patent Application No. 2023-506058 (See Partial Translation) (Note: KR 10-1167096 B1 was cited in a prior IDS filing.).
(Continued)

*Primary Examiner* — Jon T. Schermerhorn, Jr.
(74) *Attorney, Agent, or Firm* — Morgan, Lewis & Bockius LLP (57) ABSTRACT

Provided is a system for predicting a vent occurrence time of a battery cell, which includes a terrace portion having a sealing portion and provided on at least one side of a pouch type battery case and an electrode lead protruding from an end of the terrace portion, the system including a storage unit for collecting data about vent occurrence times according to widths of a remaining sealing portion, a measurement unit for periodically measuring a width of a remaining sealing portion of the battery cell to be measured, and a determination unit for predicting a vent occurrence time of
(Continued)

the battery case to be measured by comparing a measured width of the remaining sealing portion with the collected data.

16 Claims, 7 Drawing Sheets

(51) Int. Cl.
*G01R 31/367* (2019.01)
*G01R 31/392* (2019.01)
*H01M 10/48* (2006.01)
*H01M 50/30* (2021.01)

(52) U.S. Cl.
CPC .......... *G01R 31/392* (2019.01); *H01M 10/48* (2013.01); *H01M 50/30* (2021.01)

(58) Field of Classification Search
USPC .............................................................. 165/7
See application file for complete search history.

(56) References Cited

U.S. PATENT DOCUMENTS

| | | | | |
|---|---|---|---|---|
| 11,165,126 | B2 * | 11/2021 | Fauteux | H02K 7/145 |
| 11,894,522 | B2 * | 2/2024 | Fujishima | H01M 10/0585 |
| 12,027,715 | B2 * | 7/2024 | Seo | H01M 50/271 |
| 12,183,897 | B2 * | 12/2024 | Lim | G01R 31/3648 |
| 12,265,068 | B2 * | 4/2025 | Jung | G01M 3/16 |
| 2008/0145747 | A1 * | 6/2008 | Wu | H01M 50/3425 |
| | | | | 429/56 |
| 2010/0028567 | A1 * | 2/2010 | Suizu | G01M 11/081 |
| | | | | 428/1.32 |
| 2014/0351177 | A1 * | 11/2014 | Park | G06N 20/00 |
| | | | | 706/12 |
| 2017/0294689 | A1 | 10/2017 | Wada et al. | |
| 2019/0165432 | A1 * | 5/2019 | Park | G01R 31/387 |
| 2020/0158596 | A1 | 5/2020 | Kim et al. | |
| 2020/0350638 | A1 | 11/2020 | Hwang et al. | |
| 2021/0344057 | A1 | 11/2021 | Seo et al. | |
| 2022/0255142 | A1 | 8/2022 | Lim | |

FOREIGN PATENT DOCUMENTS

| | | | | |
|---|---|---|---|---|
| EP | 4075570 | A1 * | 10/2022 | .......... H01M 10/486 |
| EP | 4184678 | A1 * | 5/2023 | .......... H01M 50/572 |
| JP | 2016-126943 | A | 7/2016 | |
| JP | 6370902 | B2 | 8/2018 | |
| JP | 2019-522881 | A | 8/2019 | |
| JP | 2022-533542 | A | 7/2022 | |
| JP | 7327769 | B2 * | 8/2023 | ............ H01M 10/48 |
| KR | 10-1167096 | B1 | 7/2012 | |
| KR | 10-2014-0041057 | A | 4/2014 | |
| KR | 10-2018-0000416 | A | 1/2018 | |
| KR | 10-2019-0023146 | A | 3/2019 | |
| KR | 10-2000698 | B1 | 10/2019 | |
| KR | 10-2019-0139121 | A | 12/2019 | |
| KR | 10-2125238 | B1 | 6/2020 | |
| KR | 10-2020-0086172 | A | 7/2020 | |
| KR | 10-2192676 | B1 | 12/2020 | |
| KR | 10-2021-0016828 | A | 2/2021 | |

OTHER PUBLICATIONS

Office Action dated Jan. 22, 2025 issued in Korean Patent Application No. 10-2021-0086372. Note: KR 10-2019-0023146 A cited therein is already of record.
Extended European Search Report dated Sep. 30, 2024 ssued in European Patent Application No. 22833616.0.
International Search Report issued Oct. 7, 2022 in the corresponding International Patent Application No. PCT/KR2022/009293.

* cited by examiner

SYSTEM AND METHOD FOR PREDICTING VENT OCCURRENCE TIME OF BATTERY CELL

TECHNICAL FIELD

The present invention relates to a system and method for predicting a vent occurrence time of a battery cell.

This application claims the benefit of priority based on Korean Patent Application No. 10-2021-0086372, filed on Jul. 1, 2021, and the entire contents of the Korean patent application are incorporated herein by reference.

BACKGROUND ART

Recently, rechargeable and dischargeable secondary batteries have been widely used as energy sources of wireless mobile devices. In addition, secondary batteries have attracted attention as energy sources of electric vehicles, hybrid electric vehicles, etc. that have been introduced as a solution to air pollution due to existing gasoline vehicles and diesel vehicles using fossil fuels. Therefore, the types of applications using a secondary battery are diversifying due to the advantages of the secondary battery, and it is expected that secondary batteries will be applied to more fields and products in the future than now.

Secondary batteries may be classified into a lithium ion battery, a lithium ion polymer battery, a lithium polymer battery, etc. according to electrodes and a composition of an electrolyte, and among these batteries, the use of the lithium ion polymer battery, which is less prone to leakage of the electrolyte and easy to manufacture, is increasing. In general, secondary batteries are classified into a cylindrical or prismatic battery in which an electrode assembly is included in a cylindrical or rectangular metal can according to a shape of a battery case, and a pouch type battery in which an electrode assembly is included in a pouch-type case of an aluminum laminate sheet. An electrode assembly included into a battery case is a chargeable and dischargeable power generating device that includes a positive electrode, a negative electrode, and a separator between the positive electrode and the negative electrode. Electrode assemblies are classified into a jelly-roll type formed by interposing a separator between a positive electrode and a negative electrode, which are long sheet types coated with an active material, and winding a resultant structure, and a stack type in which positive electrodes and negative electrodes each having a certain size are sequentially stacked while a separator is interposed therebetween.

Figure 1:
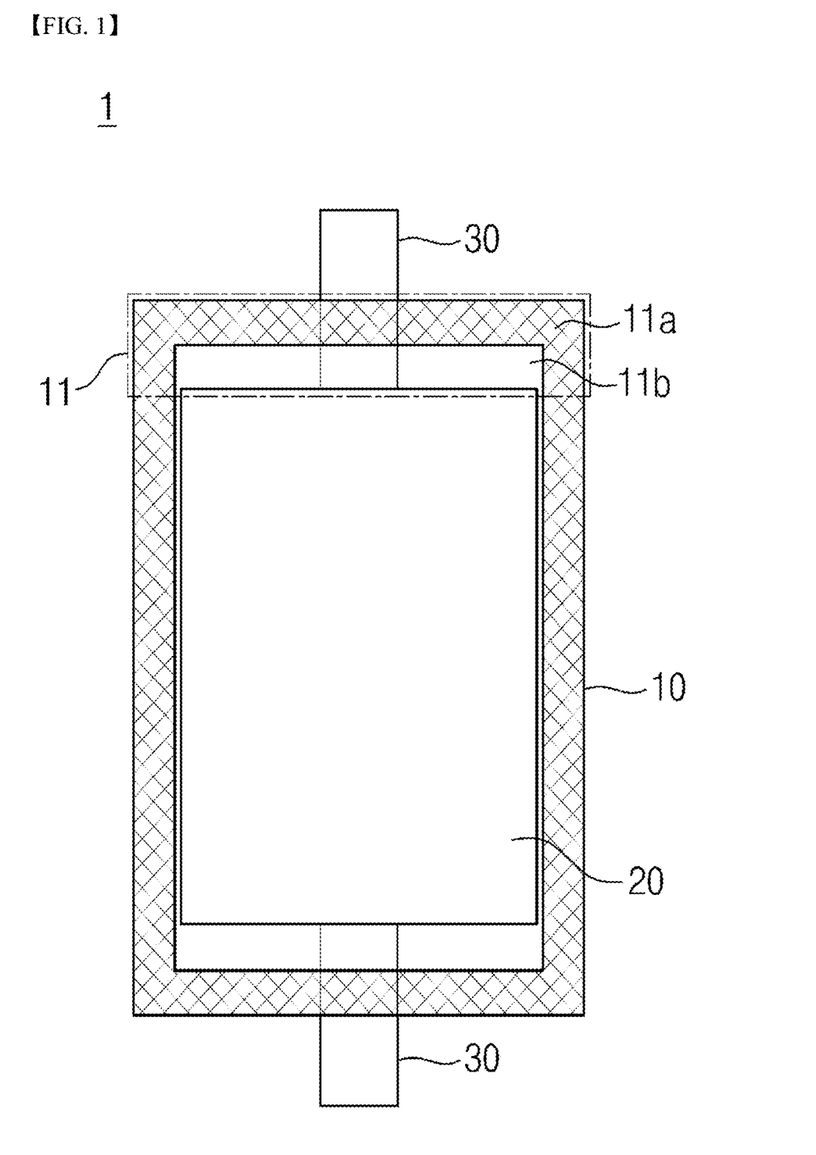
FIG. 1 is a schematic diagram illustrating a form of a general pouch type battery cell.

FIG. 1 is a schematic diagram illustrating a form of a general pouch type battery cell.

Referring to FIG. 1, the pouch type battery cell has a structure in which an electrode assembly 20 is accommodated in a pouch type battery case 10, electrode leads 30 are protruding from opposite ends of the battery case 10, and a sealing portion 11a is formed around an outer periphery of the battery case 10. In this case, the sealing portion 11a and a gas pocket portion 11b, which is an empty space between the sealing portion 11a and an accommodation space, are formed in a terrace portion 11, which is a space between the space in which the electrode assembly is accommodated and an end of the battery case. The gas pocket portion 11b is a space in which gas generated in a battery due to various causes gathers.

Various high-temperature storage experiments are performed on a battery cell as described above according to the needs of customers. The experiments are performed to determine the safety and durability of the battery cell under severe conditions. In this case, the durability and performance of the battery cell can be estimated by predicting a vent occurrence time of the battery cell through a high-temperature storage experiment.

Specifically, when the amount of gas generated in the battery cell increases for various causes such as the high-temperature environment experiment, a width of the sealing portion 11a gradually decreases and eventually bursts, thus causing discharging of the gas, i.e., a venting phenomenon.

In the related art, the vent occurrence time of the sealing portion 11a is predicted by directly measuring the width of the sealing portion 11a with the naked eye and checking for the presence of a vent. Thus, it takes a lot of time to perform the process, and the experiment should be performed again when a vent occurred at a point in time when measurement was not performed.

RELATED ART LITERATURE

Patent Document

Korean Registered Patent Publication No. 10-2125238

DISCLOSURE

Technical Problem

To address the above problem, the present invention is directed to providing a system for predicting a vent occurrence time of a battery cell, the system being capable of automatically predicting a vent occurrence time of a vent will occur and improving the accuracy of prediction.

Technical Solution

A system according to the present invention for predicting a vent occurrence time of a battery cell, which includes a terrace portion having a sealing portion and formed on at least one side of a pouch type battery case and an electrode lead protruding from an end of the terrace portion, includes a storage unit configured to collect data about vent occurrence times according to widths of a remaining sealing portion, a measurement unit configured to periodically measure a width of a remaining sealing portion of a battery cell to be measured, and a determination unit configured to predict a vent occurrence time of the battery cell to be measured by comparing a measured width of the remaining sealing portion with the collected data.

The measurement unit may include a camera configured to capture an image or video of the terrace portion, and a calculator configured to calculate a width of the remaining sealing portion in the captured image or video.

The measurement unit measures a width of the remaining sealing portion by reducing a measurement time interval as a vent occurrence time is imminent.

As a specific example, the collecting of the data and the measuring of the width of the remaining sealing portion may be performed at a high temperature of 60° C. or higher.

As a specific example, the determination unit may predict a vent occurrence time of the battery cell to be measured through machine learning or deep learning.

Specifically, the determination unit may derive a correlation between a width of the remaining sealing portion and a corresponding vent occurrence time from the data.

Also, the determination unit may predict a vent occurrence time of the battery cell according to a measured width of the remaining sealing portion for each measurement time interval of a width of the remaining sealing portion on the basis of the correlation.

As another example, the system according to the present invention for predicting a vent occurrence time of a battery cell may further include a learning unit configured to learn a result of predicting a vent occurrence time.

As a specific example, the learning unit may configure training data for predicting a vent occurrence time of the battery cell, and the determination unit may newly derive a correlation between a width of the remaining sealing portion and a corresponding vent occurrence time from the training data, and predict a vent occurrence time of the battery cell according to a measured width of the remaining sealing portion from the correlation.

Specifically, the learning unit may configure the training data by verifying the validity of the data by comparing the predicted vent occurrence time and an actual vent occurrence time and updating the data collected in the storage unit with a result of verifying the validity of the data.

In addition, the present invention provides a method of predicting a vent occurrence time of a battery cell using a system for predicting a vent occurrence time of a battery cell.

A method according to the present invention of predicting a vent occurrence time of a battery cell includes collecting data about vent occurrence times according to widths of a remaining sealing portion, periodically measuring a width of a remaining sealing portion of a battery cell to be measured, and predicting a vent occurrence time of the battery cell to be measured by comparing a measured width of the remaining sealing portion with the collected data.

As a specific example, the periodically measuring of the width of the remaining sealing portion may include capturing an image or video of a terrace portion by the camera and calculating the width of the remaining sealing portion in the captured image or video.

As a specific example, the predicting of the vent occurrence time of the battery cell to be measured may include deriving a correlation between a width of a remaining sealing portion and a corresponding vent occurrence time, and periodically predicting a vent occurrence time of the battery cell to be measured according to a measured width of the remaining sealing portion on the basis of the correlation.

As a specific example, the method according the present invention may further include learning a result of predicting a vent occurrence time.

As a specific example, the learning of the result of predicting the vent occurrence time may include verifying the validity of the data by comparing the predicted vent occurrence time with an actual vent occurrence time, and configuring training data by updating the data with a result of verifying the validity of the data.

The predicting of the vent occurrence time of the battery cell to be measured may include newly deriving a correlation between a width of a remaining sealing portion and a corresponding vent occurrence time from the training data, and predicting a vent occurrence time of the battery cell according to a measured width of the remaining sealing portion from the correlation.

Advantageous Effects

According to the present invention, a vent occurrence time is predicted on the basis of machine learning, thereby automatically predicting the vent occurrence time of the battery cell and improving the accuracy of prediction.

DETAILED DESCRIPTION OF EMBODIMENTS

Hereinafter, the present invention will be described in detail. First, the terms or expressions used in the present specification and claims should not be construed as being limited to meanings defined in commonly used dictionaries, and should be understood according to meanings and concepts consistent with the technical idea of the present invention based on the principle that the inventor(s) of the application can appropriately define the terms or expressions to explain the present invention in the best way.

It should be understood that the terms "comprise" and/or "comprising", when used herein, specify the presence of stated features, integers, steps, operations, elements, components, or a combination thereof, but do not preclude the presence or addition of one or more features, integers, steps, operations, elements, components, or a combination thereof. It should be understood that when a component such as a layer, a film, a region, a plate or the like is referred to as being "on" another component, the component is "directly on" the other component or another component is interposed between these components. It should be understood that when a component such as a layer, a film, a region, a plate or the like is referred to as being "below" another component, the component is "directly below" the other component or another component is interposed between these components. In addition, it should be understood that when a component is "on" another component, the component is on or below the other component.

Hereinafter, the present invention will be described in detail.

First Embodiment

Figure 2:
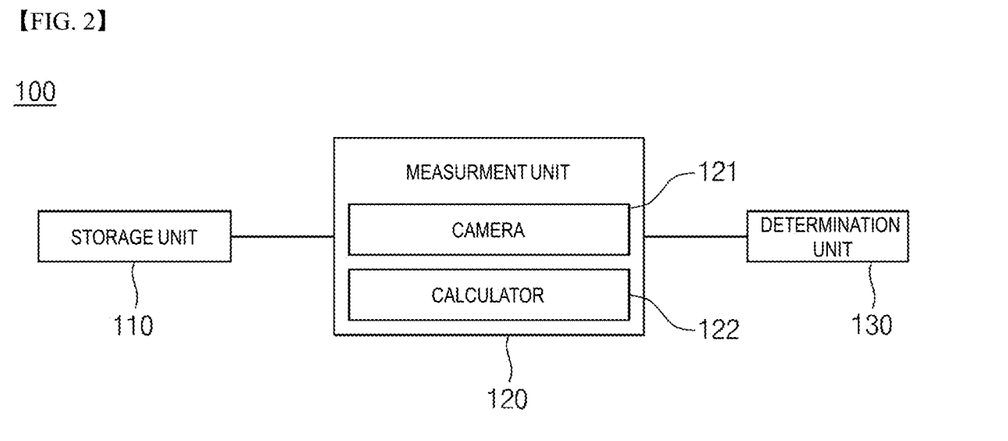
FIG. 2 is a block diagram illustrating a configuration of a system for predicting a vent occurrence time of a battery cell according to an embodiment of the present invention.
Figure 3:
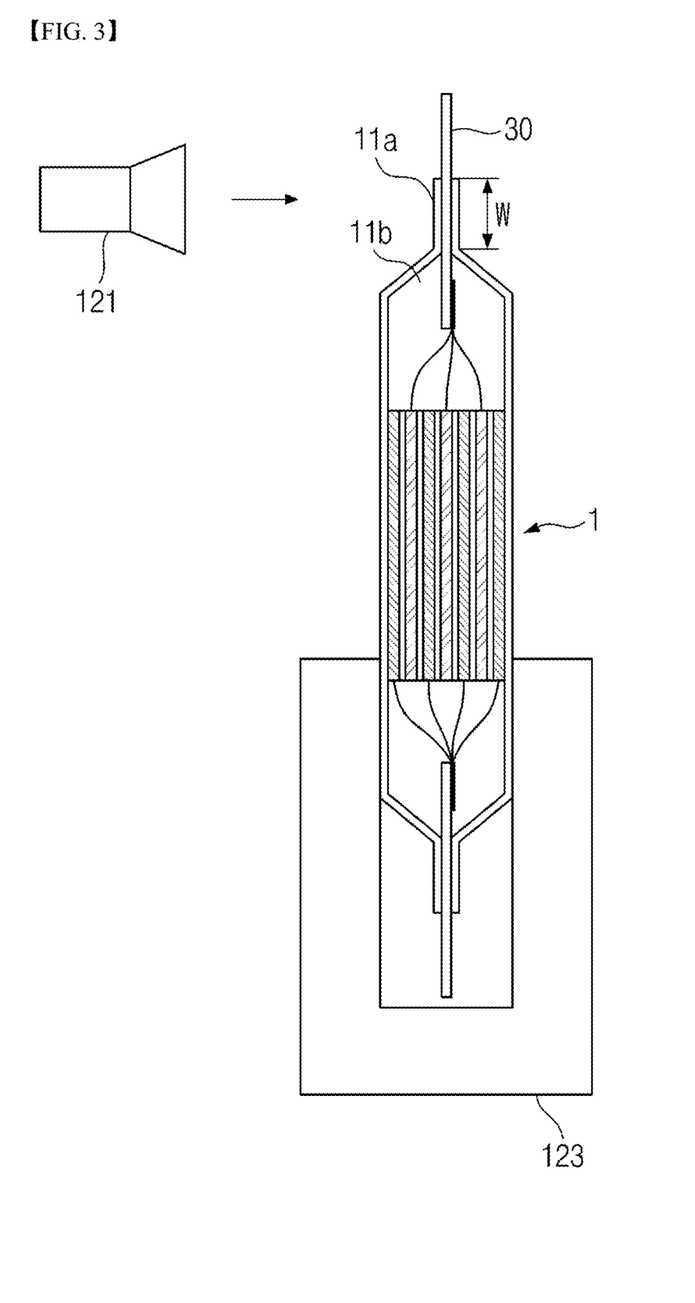
FIG. 3 is a schematic diagram illustrating a process of measuring a width of a remaining sealing portion.

FIG. 2 is a block diagram illustrating a configuration of a system for predicting a vent occurrence time of a battery cell, according to an embodiment of the present invention. FIG. 3 is a schematic diagram illustrating a process of measuring a width of a remaining sealing portion.

Referring to FIG. 2, the present invention relates to a system 100 for predicting a vent occurrence time of a battery cell, which includes a terrace portion having a sealing portion and formed on at least one side of a pouch type battery case and an electrode lead protruding from an end of the terrace portion, and the system 100 includes a storage unit 110 for collecting data about a vent occurrence time according to widths of a remaining sealing portion, a measurement unit 120 for periodically measuring a width w of a remaining sealing portion of a battery cell to be measured, and a determination unit 130 for predicting a vent occurrence time of the battery cell to be measured by comparing a measured width of the remaining sealing portion with the collected data.

According to the present invention, a vent occurrence time is predicted on the basis of machine learning, thereby automatically predicting the vent occurrence time and improving the accuracy of prediction.

Referring to FIGS. 1 to 3, the present invention is directed to predicting a vent occurrence time of a pouch type battery cell. As described above, the pouch type battery cell has a structure in which an electrode assembly 20 is accommodated in a pouch type battery case 10, electrode leads 30 are protruding from opposite ends of the battery case 10, and a sealing portion 11a is formed around an outer periphery of the battery case 10. In this case, the sealing portion 11a and a gas pocket portion 11b, which is an empty space between the sealing portion 11a and an accommodation space, are formed in a terrace portion 11, which is a space between a space in which the electrode assembly is accommodated and an end of the battery case.

The electrode leads 30 include a positive electrode lead and a negative electrode lead, and the positive electrode lead and the negative electrode lead may be protruding from the battery case in opposite directions as shown in FIG. 1 and FIG. 3 but are not limited thereto. The electrode assembly and the components thereof are well-known to those skilled in the art and thus a detailed description thereof is omitted.

Meanwhile, the battery case 10 is not particularly limited as long as it can be used as an exterior material for packaging a battery, and a cylindrical, prismatic or pouch type and particularly, a pouch type battery case, may be used. The pouch type battery case is generally formed of an aluminum laminate sheet and may include an internal sealant layer for sealing, a metal layer preventing the penetration of a material, and an external resin layer forming an outermost layer of the pouch type battery case. Details of the battery case are well-known to those skilled in the art and thus a description thereof is omitted here.

In this case, when a battery cell operates in a high-temperature environment, e.g., a high-temperature storage experiment, a large amount of gas is generated in the battery cell and collected in the gas pocket portion 11b. However, when the amount of gas increases excessively, the sealing of the sealing portion 11a is destroyed, resulting in a venting phenomenon in which an internal gas is discharged to the outside. In this case, the venting phenomenon does not occur all at once but as the internal pressure of the battery cell increases, a width w of a remaining sealing portion gradually decreases, and sealing is destroyed when the internal pressure is not within a range of a threshold, thereby causing the venting phenomenon to occur. Here, the width w of the remaining sealing portion means a width w of a sealing portion that remains when sealing portions (thermally fused portions) between sealing portions are gradually torn as the internal pressure of the battery cell increases. According to the present invention, a vent occurrence time of the battery cell according to a measured width of a remaining sealing portion may be predicted from a plurality of pieces of data without having to wait until the venting phenomenon actually occurs.

The plurality of pieces of data are pieces of data about vent occurrence times according to widths of remaining sealing portions, and are stored in the storage unit 110. In the storage unit 110, captured images, widths of remaining sealing portions, and vent occurrence times are accumulated during predicting and measuring vent occurrence times for a plurality of battery cells, thereby generating big data. Here, each of the vent occurrence times may be defined as the time taken until the occurrence of a vent after measuring the remaining sealing portion. In this case, the storage unit 110 may include a database (DB) for storing and managing the data described above, and the data may be used as basic data for configuring training data in a learning unit described below. In this case, the data may be classified and stored according to specifications of the battery cell and experimental conditions.

The measurement unit 120 measures a width of a remaining sealing portion of a battery cell 1 to be measured. Specifically, the measurement unit 120 may include a camera 121 for capturing an image or video of the terrace portion 11, and a calculator 122 for calculating a width of the remaining sealing portion in a captured image or video.

Figure 4:
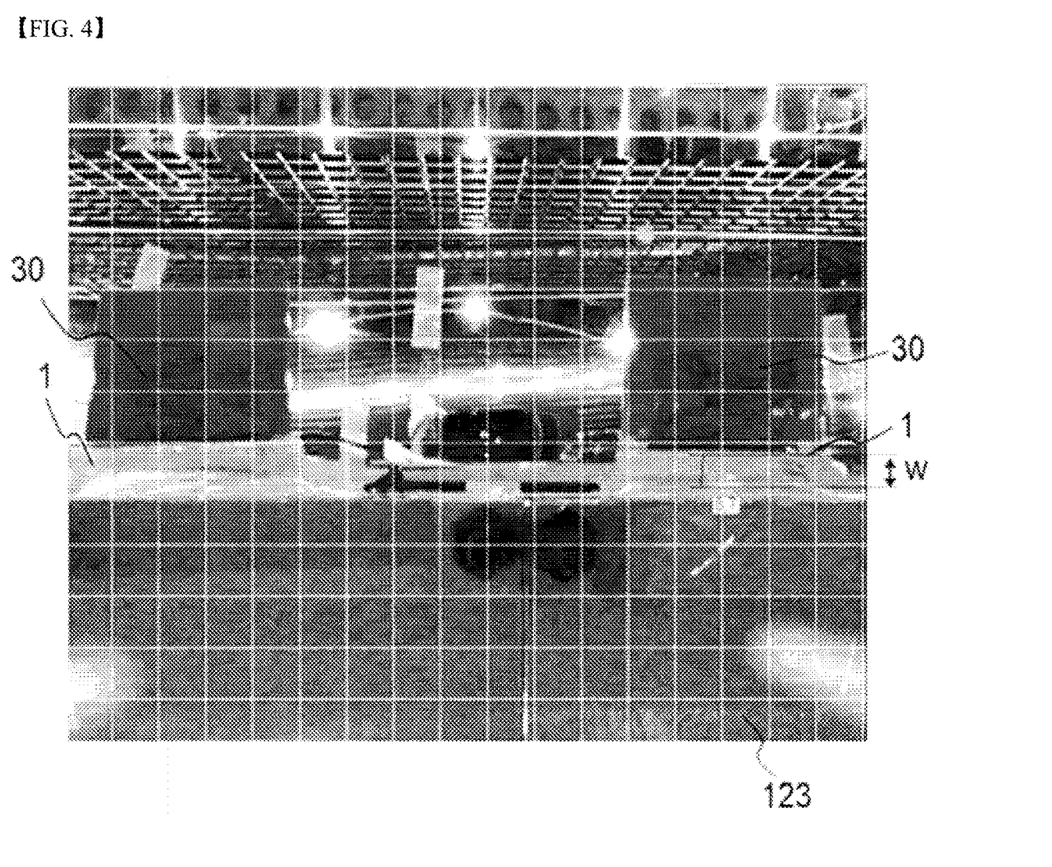
FIG. 4 is a photograph showing an image captured by a camera.

Referring to FIG. 1 and FIG. 3, an image or video of the terrace portion 11 may be captured in a state in which the battery cell 1 is mounted in a jig 123. At least one battery cell 1 may be mounted in the jig 123 to be fixed, so that an image or video of the terrace portion 11 may be easily captured. Although FIG. 3 illustrates that one battery cell 1 is mounted in the jig 123, image or videos of two or more battery cells 1 may be simultaneously captured while the two or more battery cells 1 are mounted in the jig 123 as shown in FIG. 4. In addition, the battery cell 1 may be mounted in the jig 123 in a direction perpendicular to the ground, so that an image of the terrace portion 11 may be easily captured and gas may be easily collected in the gas pocket portion 11b. In addition, a shape of the jig 123 is not particularly limited but a contact area between the battery cell and the jig 123 is preferably minimized so as not to have an effect on the venting of the battery cell 1. The electrode lead 30 is preferably covered with a cap to prevent a short circuit as shown in FIG. 4.

The camera 121 is not particularly limited as long as an image or video can be captured by the camera 121, and for example, a charge-coupled device (CCD) camera or the like may be used.

In addition, the measurement part 120 may further include a display device (not shown) displaying a captured image in the form of image data.

FIG. 4 is a photograph showing an image captured by a camera.

As shown in FIG. 4, an image captured by the camera 121 is visually displayed by the display device. A width w of a remaining sealing portion in the displayed image is measured by the calculator 122. The calculator 122 may be a general computing device.

In this case, the display device may display a scale, which is in a grid form of a certain size, on the image, and the calculator 122 calculates a width of a portion of the image corresponding to the remaining sealing portion by comparison with the scale as shown in FIG. 4. In the case of FIG. 4, it can be seen that the width of the remaining sealing portion is calculated to be 8.7 mm.

The above process may be performed periodically until a vent occurs in a battery cell, and data about a vent occurrence time according to a width of the remaining sealing portion may be stored in the storage unit 110. In this case, the width of the remaining sealing portion decreases gradually due to gas generated in the battery cell, and the measurement part 120 measures the width of the remaining sealing portion by reducing a measurement time interval as the vent occurrence time is imminent, i.e., as the width of the remaining sealing portion decreases. This is because as the width of the remaining sealing portion decreases, adhesion between pouches decreases, thus accelerating separation. Therefore, a measurement time interval may be set to be short to accurately identify the vent occurrence time.

Meanwhile, the venting phenomenon of the battery cell is likely to occur when the battery cell is placed in a high-temperature environment, e.g., a high-temperature storage experiment, and the collecting of the data and the measuring of the width of the remaining sealing portion may be performed at a high temperature, and particularly, at 60° C. or higher.

A result of measurement performed by the measurement part 120 may be transmitted and stored in the storage unit 110, and configured as part of data.

When the width of the remaining sealing portion is measured, the vent occurrence time of the battery cell is predicted. The determination unit 130 may be operated in a computing device, and the vent occurrence time of the battery cell to be measured may be automatically predicted through machine learning or deep learning, thereby increasing the accuracy of prediction.

Specifically, the determination unit 130 may derive a correlation between a width of the remaining sealing portion and a corresponding vent occurrence time from the data, i.e., the data about a vent occurrence time according to a width of the remaining sealing portion. The correlation between the width of the remaining sealing portion and the corresponding vent occurrence time may be understood to mean a tendency indicated by a vent occurrence time (a time taken to vent) with respect to a measured width of the remaining sealing portion. For example, the correlation between the width of the remaining sealing portion and the corresponding vent occurrence time may be expressed as a single equation, and this can be done by regression analysis. Therefore, a relational expression reflecting the data appropriately may be derived by setting the width of the remaining sealing portion as an independent variable and setting the vent occurrence time as a dependent variable. The relational expression may be in any of various forms such as a linear function, a quadratic function, other polynomial functions, an exponential function, and a log function. For example, when there is a linear function relationship between the vent occurrence time and the width of the remaining sealing portion, the relational expression may be expressed as the following equation:

$$y=ax+b \quad (1)$$

(In Equation (1) above, x denotes the width (mm) of the remaining sealing portion, y denotes the time (h) taken until the occurrence of a vent after the measuring of the width of the remaining sealing portion, and a and b are constants.)

As described above, by expressing the correlation between the width of the remaining sealing portion and the vent occurrence time as an equation, a vent occurrence time may be automatically predicted by only measuring the width of the remaining sealing portion.

When the correlation between the width of the remaining sealing portion and the corresponding vent occurrence time is derived, the determination unit 130 may predict a vent occurrence time of the battery cell according to a measured width of the remaining sealing portion on the basis of the correlation. When the correlation is derived in the form of the above equation, a vent occurrence time may be predicted by substituting the measured width of the remaining sealing portion into Equation (1) above. Because the measurement part 120 predicts a width of the remaining sealing portion at certain intervals of time, the determination unit 130 may also predict a vent occurrence time of the battery cell for each measurement interval of a width of the remaining sealing portion.

The above-described processes are performed automatically and repeatedly to the vent occurrence time of the battery cell. That is, the system according to the present invention for predicting a vent occurrence time of a battery cell may measure a width of a remaining sealing portion and predict a vent occurrence time by comparing the measured width with previously stored data, and repeatedly measure the width of the remaining sealing portion at certain intervals of time when venting does not occur. Through the above method, the accuracy of prediction may be increased more than that of an experiment conducted by checking with the naked eye, and the moment of occurrence of the vent may be accurately identified.

Second Embodiment

Figure 5:
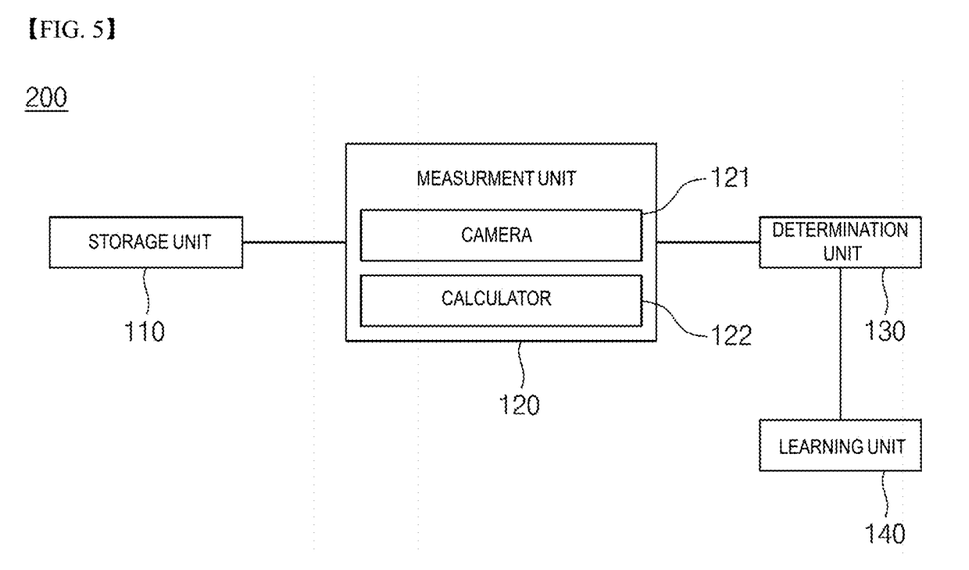
FIG. 5 is a block diagram illustrating a configuration of a system for predicting a vent occurrence time of a battery cell according to another embodiment of the present invention.
Figure 6:
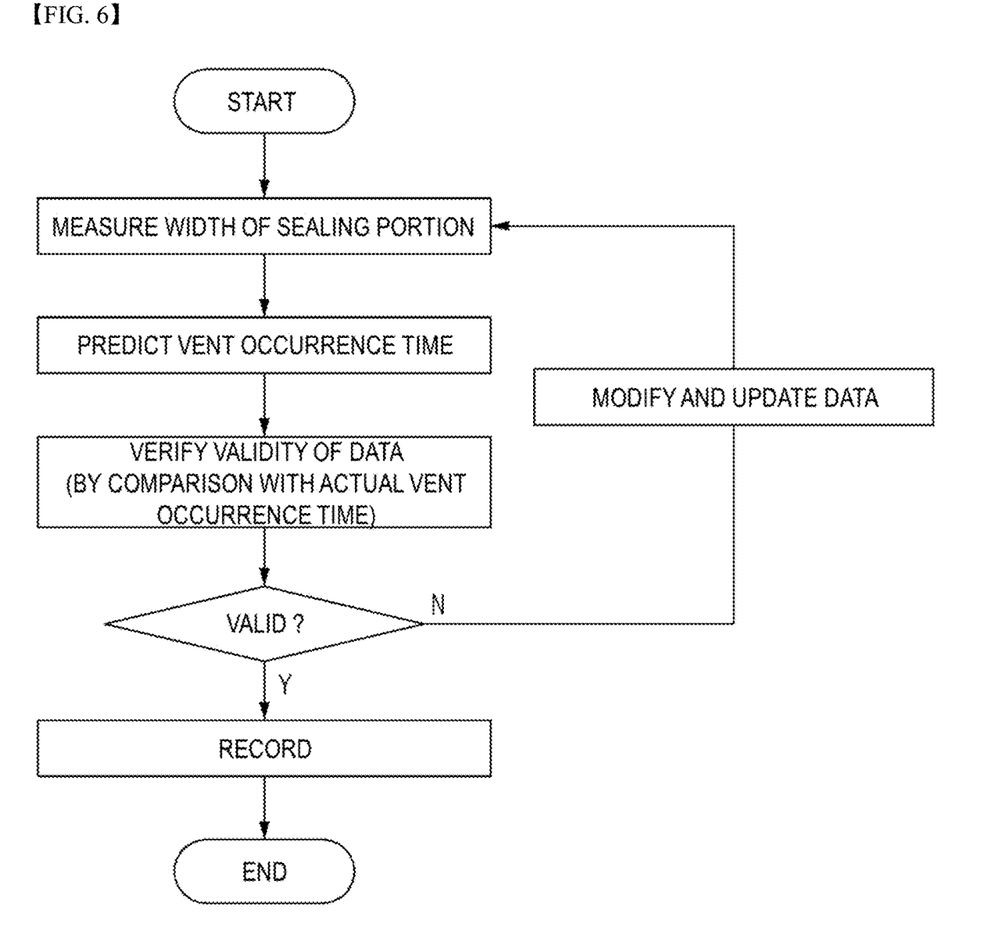
FIG. 6 is a flowchart of a process of learning a result of prediction.
Figure 7:
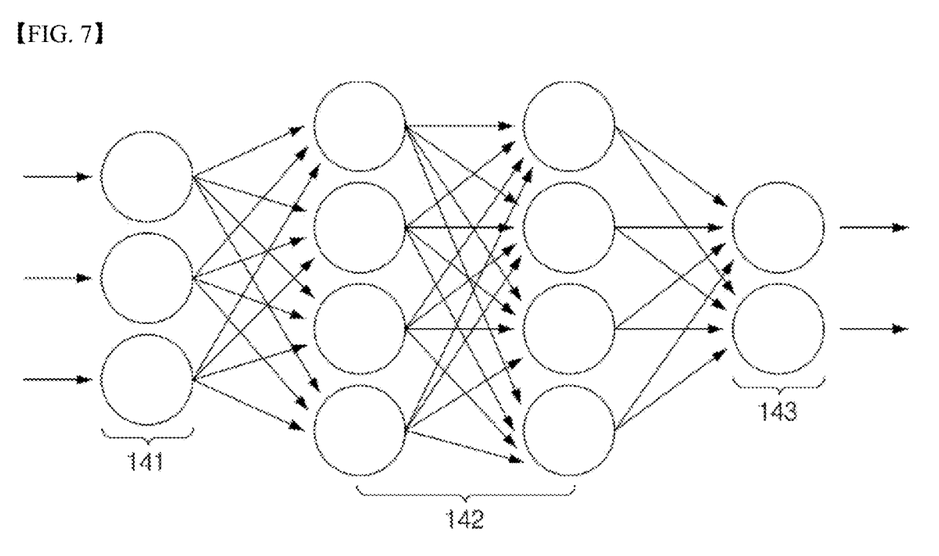
FIG. 7 is a schematic diagram illustrating a learning method based on deep learning.

FIG. 5 is a block diagram illustrating a configuration of a system for predicting a vent occurrence time of a battery cell according to another embodiment of the present invention. FIG. 6 is a flowchart of a process of learning a result of prediction. FIG. 7 is a schematic diagram illustrating a learning method based on deep learning.

Referring to FIG. 5, a system 200 for predicting a vent occurrence time of a battery cells may further include a learning unit 140 for learning the result of prediction. In the present invention, functions of the learning unit 140 may be divided compared to a calculator and a determination unit for convenience of description, configured as a computing device similar to the calculator and the determination unit, and operated in the same device as the calculator and the determination unit. According to the present invention, the accuracy of prediction may be further increased by reflecting whether a result of prediction is accurate or inaccurate using machine learning or deep learning.

Referring to FIG. 5 and FIG. 6, the learning unit 140 may configure training data for predicting a vent occurrence time. The training data may be configured by updating data previously stored in a storage unit with a newly measured result. First, the learning unit 140 verifies the validity of data by comparing a predicted vent occurrence time and an actual vent occurrence time. When the predicted vent occurrence time and the actual vent occurrence time are the same, the data is determined to be valid and recorded in the storage unit 110. When the predicted vent occurrence time and the actual vent occurrence time are not the same, the data stored in the storage unit 110 is modified and updated. In this case, the reason why the data became inconsistent may be analyzed by taking into account experimental conditions (temperature of a battery cell and the like) that are input together with the stored data. The learning unit 140 configures the training data by updating the storage unit 110 with a result of the verification. In this way, the learning unit 140 may derive more accurate data through machine learning.

Furthermore, when configuring the training data and learning data are performed by the learning unit 140 through deep learning, the learning unit 140 may be configured as a deep neural network (DNN).

The DNN is one of deep learning (machine learning) models for classifying input data on the basis of learned data, and may be understood as a system or network that forms one or more layers in one or more computers and performs judgment based on a plurality of pieces of data.

Referring to FIG. 7, the DNN may include an input layer 141, one or more hidden layers 142, and an output layer 143.

The training data is input to the input layer 141, and a weight is updated inversely by comparing an actual value with a result value obtained by calculation through the one or more hidden layers 142 and the output layer 143. After learning is completed, a result value may be obtained by inputting information necessary for prediction.

The one or more hidden layers 142 may include a convolutional layer, a pooling layer and a fully connected layer. Here, the convolutional layer may extract a feature map with respect to an image input to the input layer and perform a convolution operation. The pooling layer may be connected to the convolutional layer to perform sub-sampling on an output of the convolutional layer. The fully connected layer may be connected to the pooling layer, and learns the sub-sampled output of the pooling layer to learn according to a category to be output to the output layer 143.

A structure in which the layers of the DNN are connected may be formed by appropriately selecting a well-known algorithm, and may be, for example, a convolutional neural network (CNN) structure or a recurrent neural network (RNN) structure.

The DNN may be implemented in one computer or through a network by connecting a plurality of computers.

The learning unit 140 inputs updated training data to the input layer 141 of the DNN. A final output is output from the output layer 143 when the input training data is passed through the hidden layer 142. The learning unit 140 may learn newly updated training data obtained by updating a weight according to a result of verifying the validity of a result of prediction.

When learning of data is completed, the determination unit 130 newly derives a correlation between a width of a remaining sealing portion and a corresponding vent occurrence time from the learned data, and predicts a vent occurrence time of a battery cell according to a measured width of the remaining sealing portion on the basis of the correlation. Thereafter, a process of verifying the validity of a prediction result and reflecting a result of the verification may be repeatedly performed to further increase the accuracy of the prediction result.

In addition, the present invention provides a method of predicting a vent occurrence time of a battery cell on the basis of the vent occurrence time of a battery cell as described above.

Specifically, the method of predicting a vent occurrence time of a battery cell may include collecting data about a vent occurrence time according to a width of a remaining sealing portion, periodically measuring a width of a remaining sealing portion of a battery cell to be measured, and predicting a vent occurrence time of the battery cell to be measured by comparing a measured width of the remaining sealing portion with the collected data.

In the collecting of the data, captured images and widths of the remaining sealing portion and vent occurrence times may be accumulated in the storage unit during a process of predicting and measuring vent occurrence times for a plurality of battery cells.

The periodically measuring of the width of the remaining sealing portion may include capturing an image or video of a terrace portion by the camera and calculating a width of the remaining sealing portion in the captured image or video. The capturing of the image or video may be performed in a state in which the battery cell is mounted in a jig. The width of the remaining sealing portion may be measured while the captured image is displayed on a display device.

The measuring of the width of the remaining sealing portion may be performed periodically until the vent occurrence time of the battery cell, and data about vent occurrence times according to widths of the remaining sealing portion may be stored in a storage unit. In this case, the width of the remaining sealing portion may be measured by reducing a measurement time interval as the vent occurrence time is imminent. The process may be performed at high temperature of 60° C. or higher.

Meanwhile, the predicting of the vent occurrence time of the battery cell to be measured may be performed by machine learning or deep learning, and may include deriving a correlation between a width of the remaining sealing portion and a corresponding vent occurrence time, and periodically predicting a vent occurrence time of the battery cell to be measured according to a width of the remaining sealing portion on the basis of the correlation. The deriving of the correlation may be performed by regression analysis as described in detail above.

The method of predicting a vent occurrence time of the battery cell according to the present invention may further include learning a prediction result.

The learning of the prediction result may include verifying the validity of data by comparing the predicted vent occurrence time and an actual vent occurrence time, and configuring training data by updating the data with a result of the verification.

Thereafter, a correlation between a width of the remaining sealing portion and a corresponding vent occurrence time may be newly derived from the training data, and a vent occurrence time of the battery cell according to a measured width of the remaining sealing portion may be predicted from the correlation.

The above description is only an example of the technical idea of the present invention and various modifications and changes may be made by those of ordinary skill in the technical field to which the present invention pertains without departing from the essential features of the present invention. Therefore, the drawings of the present invention set forth herein are intended not to limit the technical idea of the present invention but to describe the technical idea, and the scope of the technical idea of the present invention is not limited by the drawings. The scope of protection for the present invention should be interpreted based on the following claims and all technical ideas within the same scope as the present invention should be interpreted as being included in the scope of the present invention.

In the present specification, terms representing directions such as upper, lower, left, right, forward and backward directions are used only for convenience of description and thus it will be obvious that these terms may be changed according to a position of an object or an observer.

REFERENCE NUMERALS

1: battery cell
10: battery case
11: terrace portion
11a: sealing portion
11b: gas pocket portion
20: electrode assembly
30: electrode lead
100: system for predicting vent occurrence time
110: storage unit
120: measurement unit 121: camera
122: calculator
123: zig
130: determination unit
140: learning unit
141: input layer
142: hidden layer
143: output layer

The invention claimed is:

1. A system for predicting a vent occurrence time of a battery cell, which includes a terrace portion having a sealing portion and provided on at least one side of a pouch type battery case and an electrode lead protruding from an end of the terrace portion, the system comprising:
 a storage unit configured to collect data about vent occurrence times according to widths of a remaining sealing portion;
 a measurement unit configured to periodically measure a width of the remaining sealing portion of the battery cell to be measured; and
 a determination unit configured to predict a vent occurrence time of the battery cell to be measured by comparing the measured width of the remaining sealing portion with the collected data.

2. The system of claim 1, wherein the measurement unit comprises:
 a camera configured to capture an image or video of the terrace portion; and
 a calculator configured to calculate a width of the remaining sealing portion in the captured image or video.

3. The system of claim 1, wherein the measurement unit is configured to measure a width of the remaining sealing portion by reducing a measurement time interval as the vent occurrence time is imminent.

4. The system of claim 1, wherein the collecting of the data and the measuring of the width of the remaining sealing portion are to be performed at a temperature of 60° C. or higher.

5. The system of claim 1, wherein the determination unit is configured to predict the vent occurrence time of the battery cell to be measured through machine learning or deep learning.

6. The system of claim 5, wherein the determination unit is configured to derive a correlation between a width of the remaining sealing portion and a corresponding vent occurrence time from the data.

7. The system of claim 6, wherein the determination unit is configured to predict the vent occurrence time of the battery cell according to a measured width of the remaining sealing portion for each measurement time interval of a width of the remaining sealing portion on a basis of the correlation.

8. The system of claim 1, further comprising a learning unit configured to learn a result of predicting the vent occurrence time.

9. The system of claim 8, wherein the learning unit is to configure training data for predicting the vent occurrence time, and
 the determination unit is configured to newly derive a correlation between a width of the remaining sealing portion and a corresponding vent occurrence time from the training data, and is configured to predict the vent occurrence time of the battery cell according to a measured width of the remaining sealing portion from the correlation.

10. The system of claim 8, wherein the learning unit is to configure the training data by verifying validity of the data by comparing the predicted vent occurrence time and an actual vent occurrence time and updating the data collected in the storage unit with a result of verifying the validity of the data.

11. A method of predicting the vent occurrence time of the battery cell using the system of claim 1, the method comprising:
 collecting the data about vent occurrence times according to the widths of the remaining sealing portion;
 periodically measuring the width of the remaining sealing portion of the battery cell to be measured; and
 predicting the vent occurrence time of the battery cell to be measured by comparing the measured width of the remaining sealing portion with the collected data.

12. The method of claim 11, wherein the periodically measuring of the width of the remaining sealing portion comprises capturing an image or video of the terrace portion by a camera, and calculating a width of the remaining sealing portion in the captured image or video.

13. The method of claim 11, wherein the predicting of the vent occurrence time of the battery cell to be measured comprises deriving a correlation between a width of the remaining sealing portion and a corresponding vent occurrence time, and periodically predicting the vent occurrence time of the battery cell to be measured according to the measured width of the remaining sealing portion on a basis of the correlation.

14. The method of claim 11, further comprising learning a result of predicting the vent occurrence time.

15. The method of claim 14, wherein the learning of the result of predicting the vent occurrence time comprises verifying validity of the data by comparing the predicted vent occurrence time with an actual vent occurrence time, and configuring training data by updating the data with a result of verifying the validity of the data.

16. The method of claim 15, wherein the predicting of the vent occurrence time of the battery cell to be measured comprises newly deriving a correlation between a width of a remaining sealing portion and a corresponding vent occurrence time from the training data, and predicting the vent occurrence time of the battery cell to be measured according to a measured width of the remaining sealing portion from the correlation.

* * * * *